United States Patent
Castleberry

(12) 
(10) Patent No.: US 6,676,833 B2
(45) Date of Patent: Jan. 13, 2004

(54) APPARATUS FOR REMOVING GRIT AND GREASE FROM WATER

(75) Inventor: William Earl Castleberry, Odenville, AL (US)

(73) Assignee: Schreiber Corporation, Trussville, AL (US)

( * ) Notice: Subject to any disclaimer, the term of this patent is extended or adjusted under 35 U.S.C. 154(b) by 0 days.

(21) Appl. No.: 10/382,454

(22) Filed: Mar. 6, 2003

(65) Prior Publication Data

US 2003/0183582 A1 Oct. 2, 2003

Related U.S. Application Data

(60) Division of application No. 09/698,928, filed on Oct. 27, 2000, now Pat. No. 6,551,516, which is a continuation-in-part of application No. 09/428,185, filed on Oct. 27, 1999, now abandoned.

(51) Int. Cl.[7] .................................................. C02F 1/24
(52) U.S. Cl. ..................... 210/221.1; 210/525; 210/526; 210/527; 210/538; 210/540; 210/703; 210/776; 210/803
(58) Field of Search ............................. 210/221.1, 525, 210/527, 526, 523, 221.2, 532.1, 538, 540, 703, 704, 768, 776, 800, 803

(56) References Cited

U.S. PATENT DOCUMENTS

| | | |
|---|---|---|
| 1,952,727 A | 3/1934 | Ralston |
| 2,228,017 A | 1/1941 | Pecker |
| 2,517,117 A | 8/1950 | Komline |
| 2,628,190 A | 2/1953 | Langdon |
| 3,121,680 A | 2/1964 | Ciabattari |
| 3,470,091 A | 9/1969 | Budd et al. |
| 3,627,668 A | 12/1971 | Wethly |
| 3,941,698 A | 3/1976 | Weis |
| 4,137,170 A | 1/1979 | Tateishi |
| 4,193,871 A | 3/1980 | White et al. |
| 4,257,891 A | 3/1981 | Albohn |

(List continued on next page.)

FOREIGN PATENT DOCUMENTS

| | | |
|---|---|---|
| DE | 32 02 110 A1 | 7/1983 |
| EP | 0 707 877 A1 | 4/1996 |
| FR | 2 381 723 | 9/1978 |
| FR | 2 591 215 A1 | 6/1987 |
| GB | 1140774 | 9/1967 |
| GB | 2 204 031 A | 11/1988 |
| JP | 54 49680 A | 4/1997 |
| JP | 09 117770 A | 5/1997 |
| WO | WO 91/17805 | 11/1991 |

OTHER PUBLICATIONS

Schreiber, Schreiber Pretreatment System, company communication.

Primary Examiner—Robert J. Popovics
(74) Attorney, Agent, or Firm—Alston & Bird LLP

(57) ABSTRACT

A grit-and-grease removal system includes a grit channel for degritting water by promoting settling of grit to the bottom of the channel, the grit being removed from the bottom of the channel by a traveling bridge-type grit removal device supporting a submerged grit pump. The system further includes an elongate grease channel arranged to receive degritted water from the grit channel, and having a plurality of grease skimmer pipes extending across the channel above the water level. The grease skimmer pipes are spaced apart along the length of the grease channel, and each grease skimmer pipe includes a plurality of fluid discharge orifices or nozzles spaced along the length of the pipe and oriented to blow fluid obliquely onto the water surface in the direction of a discharge end of the grease channel so as to move grease floating on the surface to the discharge end. Grease that collects at the discharge end of the grease channel is removed by a conveyor that extends into the water and lifts grease upward and out of the channel.

11 Claims, 5 Drawing Sheets

U.S. PATENT DOCUMENTS

| | | |
|---|---|---|
| 4,618,430 A | 10/1986 | Favret, Jr. et al. |
| 5,047,151 A | 9/1991 | Brandkvist |
| 5,089,118 A | 2/1992 | Mahoney |
| 5,490,920 A | 2/1996 | Fruchtbaum et al. |
| 5,494,586 A | 2/1996 | Inoue |
| 5,585,006 A | 12/1996 | Jobe |
| 5,645,726 A | 7/1997 | Pollock |
| 5,695,655 A | 12/1997 | Smati |
| 5,766,484 A | 6/1998 | Petit et al. |
| 6,551,516 B1 * | 4/2003 | Castleberry ................. 210/703 |

* cited by examiner

APPARATUS FOR REMOVING GRIT AND GREASE FROM WATER

CROSS-REFERENCE TO RELATED APPLICATION

This application is a divisional of U.S. patent application Ser. No. 09/698,928 filed Oct. 27, 2000, now U.S. Pat. No. 6,551,516, which is a continuation-in-part of U.S. patent application Ser. No. 09/428,185 filed Oct. 27, 1999, now abandoned.

FIELD OF THE INVENTION

The invention relates to water treatment and, more particularly, to methods and apparatus for removing grit and grease from water.

BACKGROUND OF THE INVENTION

City sewage, industrial waste water, and other types of water frequently include relatively large concentrations of both grit and grease. The treatment of waste water to remove impurities is generally performed with the aid of treatment devices whose operation and/or reliability can be adversely affected by grit and grease. Grit can be highly abrasive on pumps and the like, can clog filters and conduits, and can build up in tanks and thereby reduce the effective tank volume. Furthermore, excess grit can make handling and dewatering of sludge more difficult. Grease can form deposits on machinery to the point of interfering with proper operation of the machinery. Grease can also encourage the growth of microbes. Thus, it is common practice to subject waste water to an initial pretreatment operation to remove grit and grease prior to further treatment of the water to remove other impurities.

Grit is often removed by a process of sedimentation wherein water to be treated is introduced into a settling tank or the like and is allowed to remain long enough to permit grit, which is generally of greater specific gravity than water, to settle to the bottom of the tank. While in the settling tank, the water may be subjected to processes such as aeration designed to promote more-rapid settling of the grit, and additionally may be circulated or perturbed in such a way as to encourage grit to settle preferentially in certain regions of the tank. The grit is then removed from the bottom of the tank by any of various types of devices including scrapers, conveyors, pumps, and the like. One type of grit removal device that has been used in elongate grit settling channels is a traveling bridge-type device that travels lengthwise back-and-forth along the grit settling channel. The traveling bridge-type device supports a device that extends to the bottom of the channel and removes grit upwardly through a conduit and discharges the grit outside the grit channel.

A combined grit-and-grease removal system that has been developed by the assignee of the present application employs a grit channel and traveling bridge-type grit removal device as described above, in combination with a grease channel that receives degritted water from the grit channel and processes the water to remove grease. More specifically, grease is removed from the surface of the water in the grease channel by a skimmer assembly that is connected with the traveling bridge-type grit removal device so as to travel back-and-forth along the length of the grease channel, which extends parallel to the grit channel. The skimmer assembly collects grease that is floating on the surface, and a grease hoist assembly removes grease from the skimmer and carries it upwardly and out of the grease channel, where it is deposited into a grease bucket. The grit-and-grease removal system having the traveling skimmer assembly can be used only in installations in which the grease channel affords an unimpeded path for the passage of the skimmer. Furthermore, the traveling skimmer works only intermittently when the traveling bridge makes an excursion along the channels.

SUMMARY OF THE INVENTION

Accordingly, it would be desirable to provide a grit-and-grease removal system having improved grease removal components that would not limit the application of the system to installations providing an unimpeded path along the length of a grease channel. It would also be desirable to provide a grit-and-grease removal system capable of providing continuous grease removal.

The above needs are met and other advantages are achieved by the present invention, which provides a system for removing grit and grease from water in which grease removal is effected without the use of any skimmer assembly that travels the length of the grease channel, and in which grease removal can be carried out continuously.

In accordance with a preferred embodiment of the invention, a grit-and-grease removal system includes an elongate grit channel configured to receive water from a source, a traveling grit removal device operable to traverse a length of the grit channel and remove grit settled on the bottom of the grit channel, an elongate grease channel arranged to receive degritted water from the grit channel, and a plurality of grease skimmers positioned in the grease channel so as to be above an upper surface of water contained in the grease channel. The grease skimmers are spaced apart along a length of the grease channel and are adapted to receive fluid from a source, each grease skimmer having fluid discharge orifices oriented to direct fluid obliquely onto the surface of the water in a direction toward a discharge end of the grease channel so as to move grease floating on the surface toward the discharge end. The system also includes a grease removal device located at the discharge end of the grease channel and operable to remove grease from the water surface and deposit the removed grease outside the grease channel.

The system is thus amenable to installations in which it would be difficult to employ a traveling grease skimmer because of structure impeding the free passage of a skimmer. Additionally, in the prior grit-and-grease removal system employing the traveling grease skimmer, it was generally necessary to place the grease channel immediately adjacent and parallel to the grit channel and to have the length of the grease channel coextensive with that of the grit channel so that when the traveling grit removal device was traversed along the grit channel, the grease skimmer was also traversed along the grease channel. In the present invention employing non-traveling grease skimmers for grease removal, it is no longer necessary to make the grease channel coextensive with the grit channel, although it may still be advantageous to do so for other reasons. The system of the present invention also enables continuous grease removal, and does so at a relatively low capital cost inasmuch as grease skimmer devices can be made relatively inexpensively.

In a further preferred embodiment of the invention, the grit channel also includes aeration devices disposed in the grit channel so as to be submerged in water contained therein. The aeration devices are adapted to receive air from an air supply and to release air into the waste water. A first set of aeration devices impart motion to the grit/water mixture in the "dead zone" adjacent the front wall of the grit channel where the water to be treated flows into the channel, so as to prevent grit from immediately settling out and accumulating against the front wall. Farther down the grit channel, additional aeration devices promote settling of grit to the bottom of the channel. Preferably, the fluid used by the grease skimmers comprises air, and the grease skimmers and the aeration devices are supplied with air from a single common air supply. Thus, in installations employing aeration for grit removal, it is relatively simple and inexpensive to incorporate grease removal in accordance with the present invention since air for the grease skimmers is already available from the air supply used for the aeration devices.

Alternatively, the grease skimmers can employ fluids other than air, including other gases, or liquids such as water. For example, water can be pumped from one of the channels (preferably from the grease channel) and supplied to the grease skimmers.

The grease skimmers advantageously can be formed by a plurality of pipes extending transversely across the grease channel and spaced apart along its length. Each pipe preferably includes a plurality of spaced-apart orifices or nozzles formed through its side wall for discharging fluid onto the surface of the water. By appropriate location of the orifices, fluid can be impinged onto the water surface across substantially the entire width of the grease channel.

The grease removal device for removing grease from the water surface at the discharge end of the grease channel preferably comprises an inclined conveyor that lifts grease upward and away from the grease channel and allows any water also removed by the conveyor to continually flow back down the conveyor into the grease channel. Thus, the conveyor preferably performs a dewatering operation on the removed grease. Suitable conveyors include continuous belt conveyors and screw-type conveyors. The grease skimmers in concert with the conveyor enable grease to be removed on a continuous basis, independent of the operation of the traveling grit removal device.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

Figure 1:
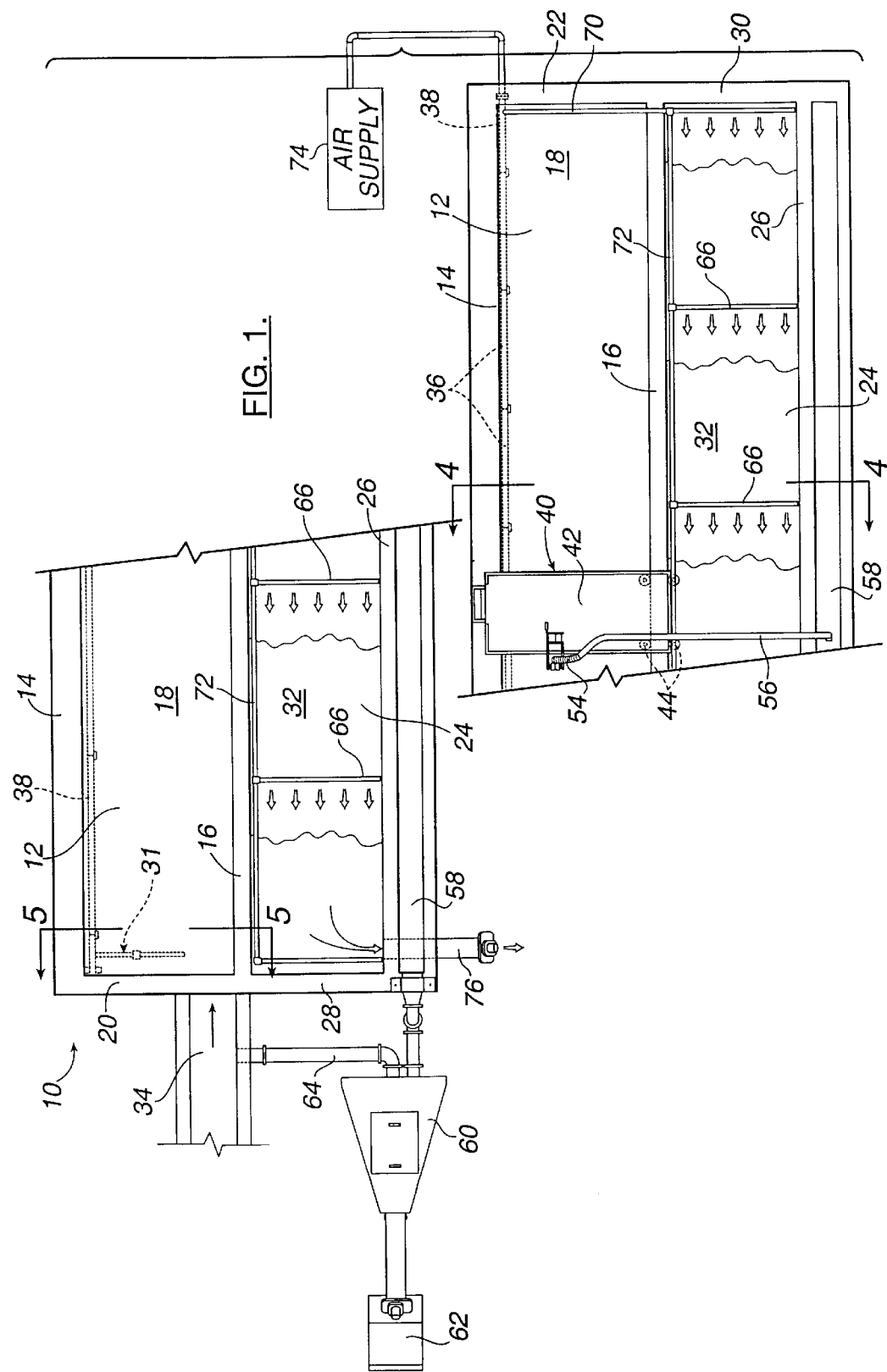
FIG. 1 is a top elevation of a grit-and-grease removal system in accordance with a preferred embodiment of the invention, in which air is the fluid used by the grease skimmers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–4, a grit-and-grease removal system in accordance with a preferred embodiment of the invention is broadly designated by reference numeral 10. The system 10 includes an elongate grit channel 12 defined by a pair of spaced-apart longitudinal walls 14 and 16 that are oriented generally vertically and project upwardly from a bottom wall 18, and opposite end walls 20 and 22 connected between the ends of the longitudinal walls and projecting upwardly from the bottom wall 18. The system also includes an elongate grease channel 24 defined by the longitudinal wall 16 and a second longitudinal wall 26 spaced therefrom, and by opposite end walls 28 and 30 connected between the ends of the longitudinal walls 16 and 26, the walls 26, 28, and 30 projecting upwardly from a bottom wall 32 which, advantageously, can be formed integral with the bottom wall 18 of the grit channel 12. Thus, the longitudinal wall 16 is a common wall separating the grit channel 12 from the grease channel 24. The wall 16 preferably includes apertures and/or baffles operable to pass degritted water from the grit channel 12 into the grease channel 24. The design of suitable apertures and baffles for passing the water is within the capabilities of one of ordinary skill in the art, and hence the apertures and/or baffles are not further described herein.

Figure 5:
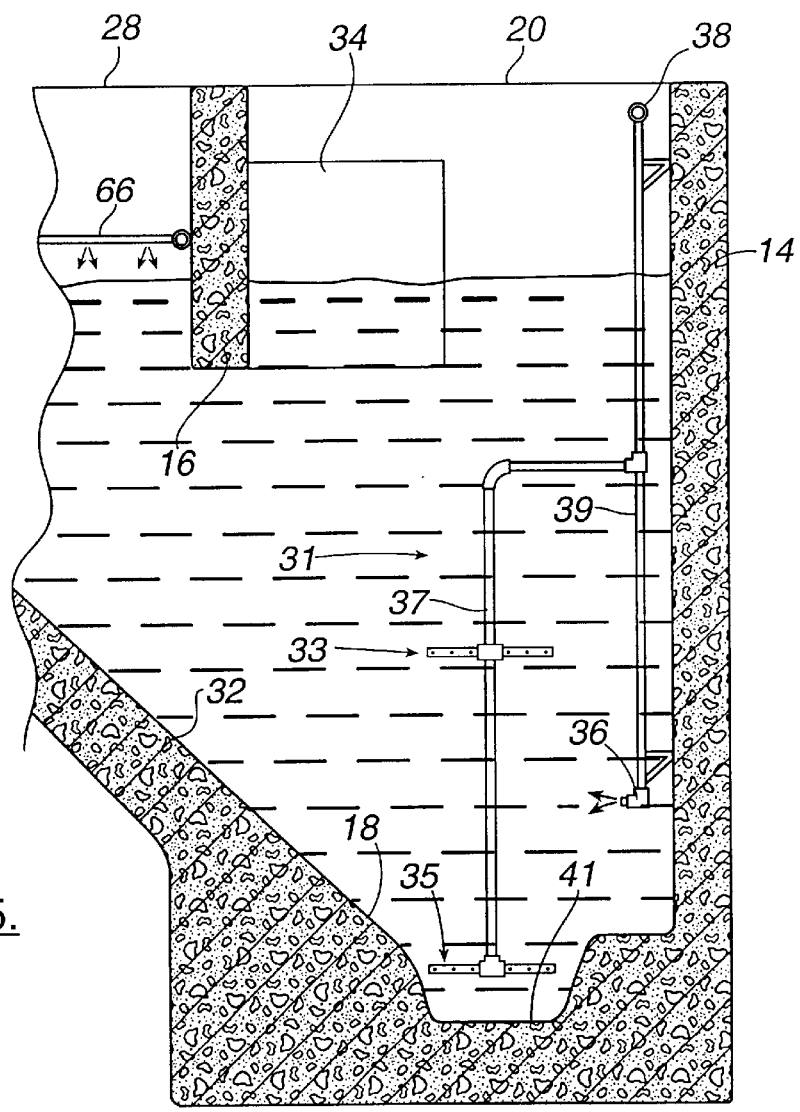
FIG. 5 is a cross-sectional view taken on line 5—5 of FIG. 1.

Water to be treated flows into one end of the grit channel 12 through an in-feed channel or conduit 34. Grit contained in the water settles to the bottom wall 18 of the grit channel. In some cases, there can be a tendency for grit to immediately settle to the bottom of the grit channel 12 adjacent to the front end wall 20, and to accumulate against the front end wall. This area is referred to as the "dead zone" because the flow velocities in this region tend to be low and recirculation tends to occur. It is undesirable to have large accumulations of grit in this area. Accordingly, in accordance with a preferred embodiment of the invention, the system 10 advantageously includes a "dead zone diffuser system" 31, as best seen in FIG. 5. The dead zone diffuser system 31 includes a mid-depth orifice bar 33 and a full-depth orifice bar 35, each defining a plurality of orifices for discharging air jets into the water. Each of the orifice bars may be formed by a pipe having a series of orifices through its side wall and being capped at both ends. For instance, a one-inch diameter PVC pipe having 1/16-inch diameter holes drilled through one side can be used. The orifice bars can be connected to a generally vertical air supply pipe 37 that is submerged in the water and in turn is connected to a main air supply pipe 38 that extends along the length of the grit channel 12 adjacent the longitudinal wall 14. The mid-depth orifice bar 33 is positioned at about half the depth of the water in the grit channel, for example about 3 feet above the bottom wall of the channel. The full-depth orifice bar 35 is positioned near the bottom wall of the channel, for example about 6 inches above the bottom wall. The air jets discharged by the orifice bars impart motion to the grit/water mixture, thereby helping to keep the grit in suspension so that it does not immediately settle out and accumulate against the front end wall 20.

The grit channel 12 also includes a plurality of aerating devices 36 for releasing air into the water contained in the channel so as to promote settling of grit farther down the channel from the dead zone. The aerating devices 36 advantageously comprise a series of coarse bubble diffusers distributed along the length of the channel so as to be submerged in the water. Air is supplied at a sufficient pressure, usually empirically determined at the site, to the bubble diffusers by the main air supply pipe 38, and a series of feeder pipes 39 (one shown in FIG. 4) that branch off the main air supply pipe 38 and feed the individual bubble diffusers. The aerating devices 36 advantageously are operable to create a spiral circulation of water in the grit channel, which causes grit to be scoured from the bottom of the channel into a recessed portion 41 (FIG. 4) of the bottom wall 18. The spiral circulation velocity caused by the aerating devices 36 determines the size and specific gravity of grit removed in the grit channel 12. Thus, the quality and particle size of the removed grit can be selectively varied by varying the air pressure supplied to the aerating devices 36, thereby varying the spiral circulation velocity in the grit channel.

Grit that has settled to the bottom of the grit channel 12 is removed by a traveling grit removal device 40 that is operable to travel along the length of the channel in a back-and-forth motion. The traveling grit removal device 40 includes a bridge 42 that spans the grit channel 12, extending transversely between the longitudinal walls 14 and 16. The bridge 42 includes wheels 44 (best seen in FIG. 4) that engage upper edge portions of the walls 14 and 16 and operate to allow the bridge 42 to roll along the grit channel. A drive device (not shown) is coupled with the bridge 42 for causing movement of the bridge along the channel. The drive device can comprise a motor coupled with one of more of the wheels 44 for rotatably driving the wheel or wheels. However, other types of drive devices alternatively can be used. The bridge 42 supports a conduit 46 that extends generally vertically downward from the bridge to a lower end of the conduit disposed proximate the bottom wall 18 of the grit channel. In one embodiment of the invention, a submerged pump (not shown) is supported by a conduit support structure (not shown) that extends along the conduit 46, such that the pump is proximate the bottom wall 18 of the channel. The pump is operable to suction grit and water through an intake structure of the pump located adjacent the bottom wall 18, and to pump the suctioned grit and water upwardly through the conduit 46 to an upper end of the conduit 46 located on the bridge 42. The upper end of the conduit 46 is connected by a flexible hose 54 to a horizontally extending discharge conduit 56 that extends from the bridge 42 to a grit discharge trough that is further described below. The discharge conduit 56 is supported by the bridge 42 such that it travels back-and-forth along with the bridge. A pump mounted on the bridge 42 can be used instead of a submerged pump for pumping grit and water up through the conduit 46. In other embodiments of the invention, the submerged pump can be eliminated and a scraper device supported by the traveling bridge 42 can be used to scrape grit on the bottom wall 18 to a location where it can be suctioned or otherwise removed from the grit channel 12.

A discharge end of the discharge conduit 56 is positioned to discharge grit and water into a grit discharge trough 58 that advantageously extends parallel to the grease channel 24 on an opposite side thereof from the grit channel. The grit discharge trough 58 can be formed integrally with the longitudinal wall 26 of the grease channel, or alternatively can be formed separately from the grease channel. A discharge end of the trough 58 feeds grit and water mixture into a grit classifier 60 operable to separate grit from the water. Grit is deposited by the classifier 60 into a grit container 62, and water from which a majority of the grit has been removed is returned to the in-feed channel or conduit 34 via a conduit 64. The grit classifier 60 advantageously comprises a screw conveyor-type classifier.

Figure 2:
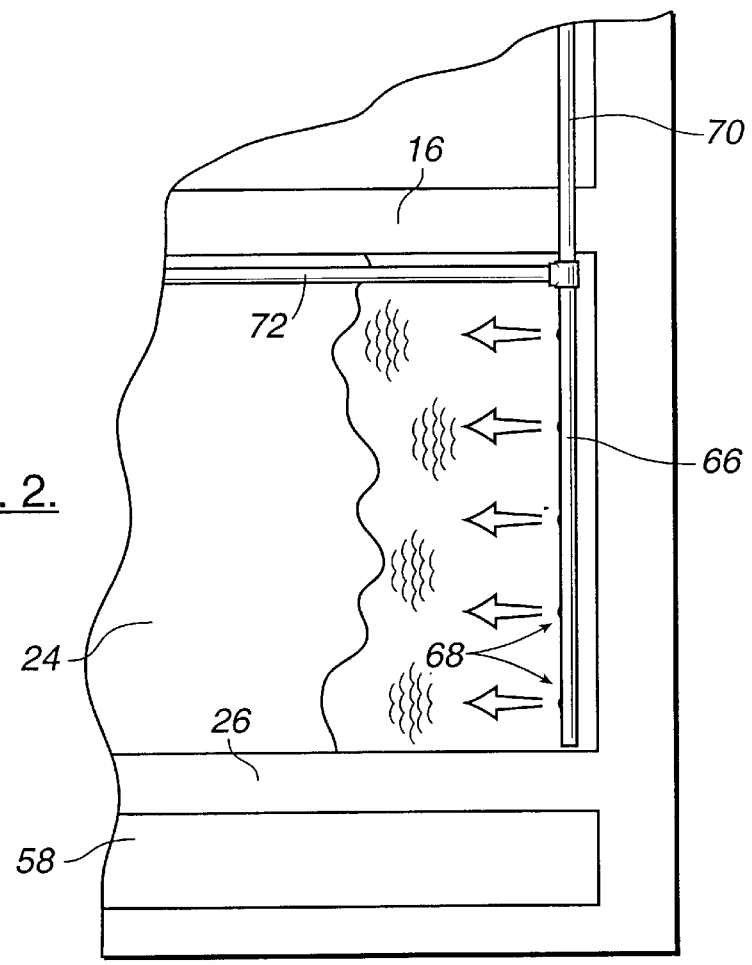
FIG. 2 is a somewhat enlarged top elevation of a portion of the system of FIG. 1.
Figure 3:
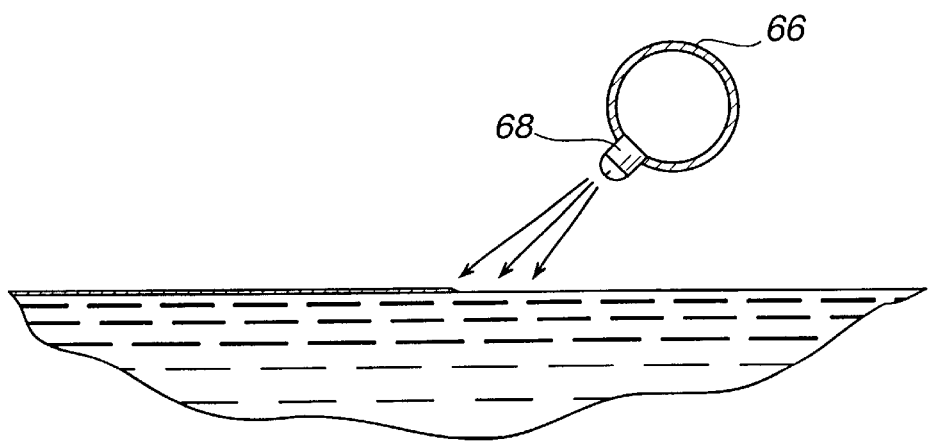
FIG. 3 is a further enlarged sectioned end elevation of one of the grease skimmers of the system in FIG. 1.
Figure 4:
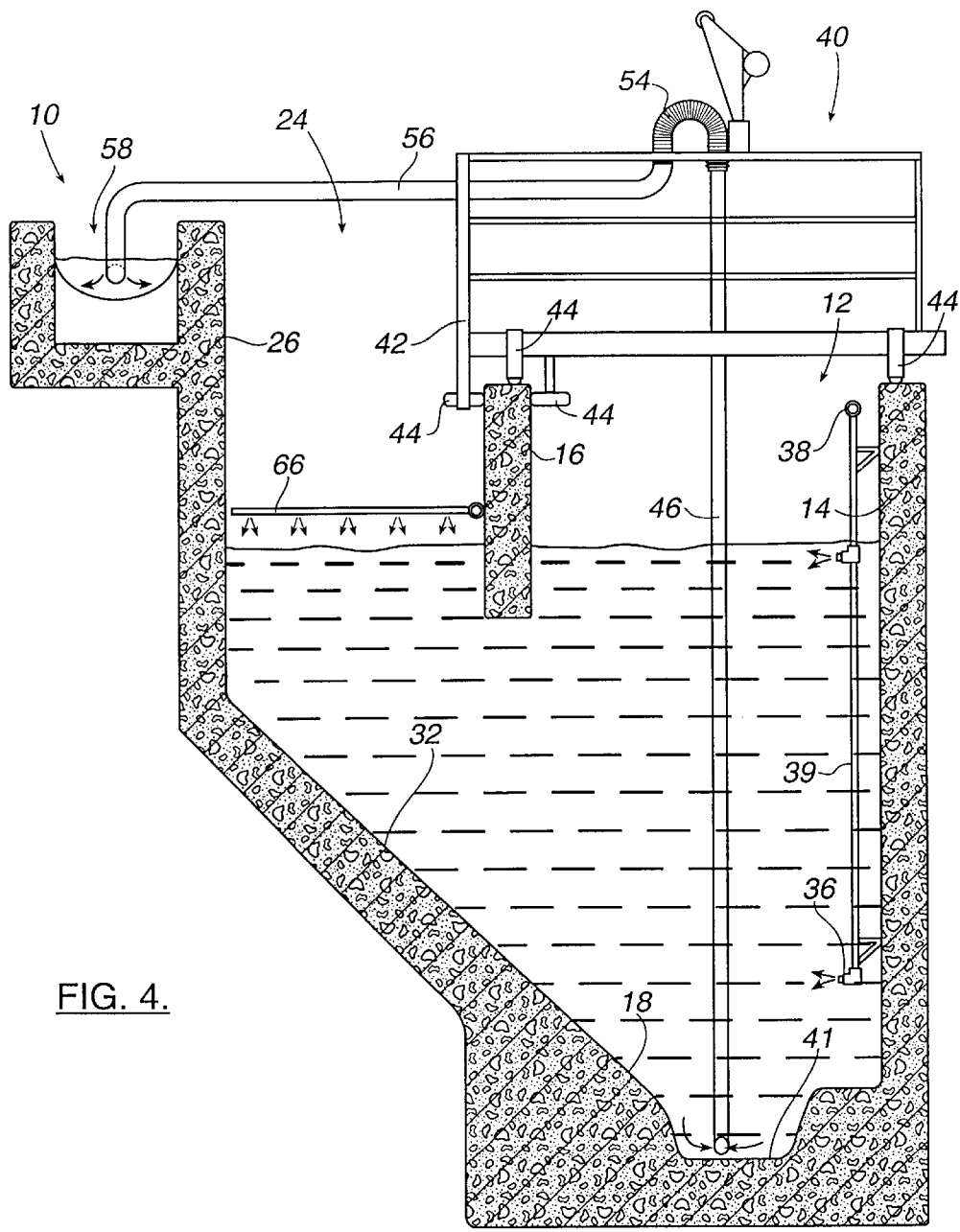
FIG. 4 is a cross-sectional view taken on line 4—4 of FIG. 1.

As previously noted, water that has been degritted in the grit channel 12 is passed from the grit channel into the grease channel 24. Grease contained in the water in the grease channel 24 tends to rise to the surface of the water and float thereon. The grit-and-grease removal system 10 includes devices for removing the grease from the water surface. More particularly, the system 10 includes a plurality of grease skimmers 66 that extend transversely across the grease channel 24 and are positioned above the surface of the water. As best seen in FIGS. 2 and 3, each grease skimmer 66 includes at least one fluid discharge orifice or nozzle 68 oriented to blow fluid obliquely onto the water surface in a direction toward a discharge end of the grease channel. More preferably, each grease skimmer 66 includes a plurality of orifices or nozzles 68 spaced apart across the width of the grease channel 24 such that fluid is blown onto the water surface across substantially the entire width of the channel. The fluid blown onto the water surface tends to move grease floating on the water toward the discharge end of the channel. The grease skimmers 66 advantageously are spaced apart along the length of the grease channel 24 with a spacing sufficiently small to enable each skimmer 66 to move grease at least as far as the next adjacent skimmer, such that grease is passed from one skimmer to the next, and so on, until the grease is moved to the discharge end of the channel.

The grease skimmers 66 are supplied with fluid by a fluid supply pipe 70 and a fluid distribution pipe 72 connected to the supply pipe 70. The fluid distribution pipe 72 preferably extends along the length of the grease channel 24 adjacent one wall thereof. The grease skimmers 66 branch off the distribution pipe 72 at a plurality of points along its length. Preferably, the grease skimmers 66 comprise pipes having orifices or nozzles 68 formed through their side walls. Where the fluid used for the grease skimmers comprises air, the supply pipe 70 for the grease skimmer system preferably is connected to the air supply pipe 38 for the grit channel aeration system, whereby both the aeration system and grease skimmer system can be supplied by a single common air supply 74 as shown in FIG. 1.

Figure 6:
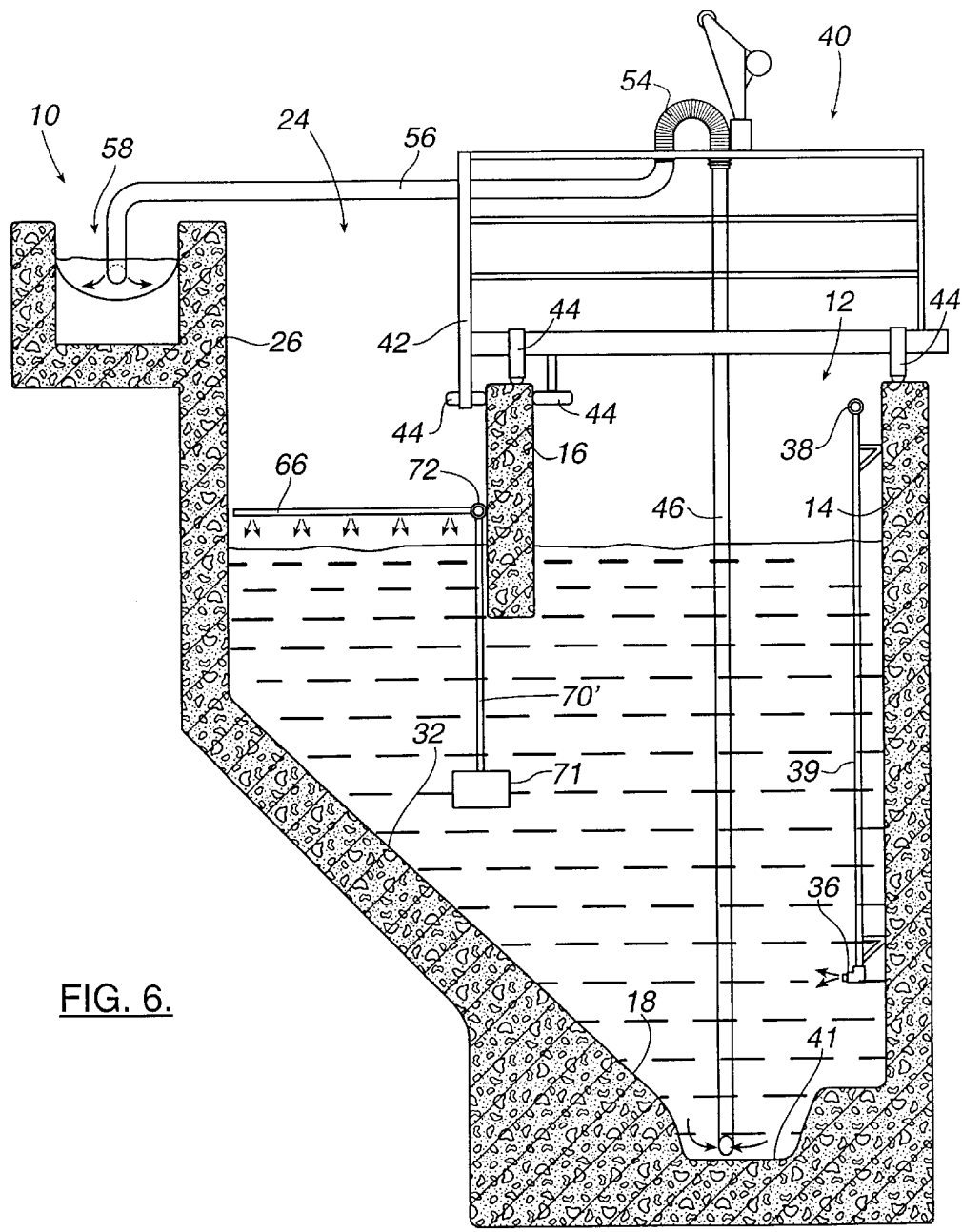
FIG. 6 is a cross-sectional view similar to FIG. 4, showing an alternative embodiment in which water is the fluid used by the grease skimmers.

An alternative embodiment of the invention depicted in FIG. 6 employs water rather than air as the skimming fluid for the grease skimmers 66. To this end, a water supply pipe 70' preferably extends down into the grease channel and is connected at its lower end to a submerged water pump 71 located in the grease channel. The pump 71 pumps water from the grease channel up through the water supply pipe 70', which is connected to the fluid distribution pipe 72. Alternatively, of course, the pump 71 could be located outside the grease channel. Thus, water is supplied to the grease skimmers 66 from the distribution pipe 72. The grease skimmers discharge the water obliquely onto the surface of the water in the grease channel so as to move grease toward the discharge end of the channel.

Grease that has been moved to the discharge end of the grease channel 24 is removed from the water surface by a conveyor 76 positioned at the discharge end. The conveyor 76 can comprise any device capable of removing grease from the water surface and transporting the grease outside the grease channel. For example, the conveyor 76 advantageously can be a continuous belt conveyor positioned such that a portion of the belt extends into the water, with the belt being inclined and driven to carry grease upward and out from the channel. Alternatively, the conveyor 76 can be an inclined Archimedes screw-type cylindrical conveyor having a lower end extending into the water and an opposite upper end positioned outside the grease channel 24. A conveyor should provide for flow of water back into the grease channel as the grease is removed, since any grease removal device inevitably will also remove some amount of water along with the grease. One way in which this can be accomplished is to use a shafted screw-type conveyor. Another way in which this can be accomplished is to provide screw flights in the absence of a central shaft. The flights pick up and transfer the grease while water returns to the channel for separate discharge through the central axis about which the flights rotate. Thus, the conveyor dewater the grease removed from the grease channel. Grease can be removed from the conveyor 76 by a scraper device or the like (not shown) at an end of the conveyor remote from the grease channel, and the removed grease can be deposited into a suitable container or into a conduit for carrying the grease to a further processing device.

The conveyor 76 can be positioned to extend transversely from the longitudinal wall 26 of the grease channel 24 as shown in FIG. 1. In this case, the conveyor 76 preferably extends through a bore or cutout formed in the wall 26 above the water level but below the level at which the grit discharge trough 58 is mounted, and the conveyor 76 extends beneath the grit discharge trough 58 as shown in FIG. 1. Alternatively, the conveyor 76 can be positioned to extend longitudinally from the end wall 28 of the grease channel.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for removing grit and grease from waste water, comprising:

an elongate grit channel configured to receive waste water from a source and operable to allow grit to settle to a bottom of the grit channel;

a traveling grit removal device operable to traverse a length of the grit channel and remove grit from the bottom of the grit channel;

an elongate grease channel arranged to receive degritted water from the grit channel;

a plurality of grease skimmers positioned in the grease channel so as to be above an upper surface of water contained in the grease channel, the grease skimmers being spaced apart along a length of the grease channel and adapted to receive fluid from a source, each grease skimmer having fluid discharge orifices oriented to direct fluid obliquely onto the surface of the water in a direction toward a discharge end of the grease channel so as to move grease floating on the surface toward the discharge end; and a grease removal device located at the discharge end of the grease channel and operable to remove grease from the water surface and deposit the removed grease outside the grease channel, wherein the grease removal device comprises a conveyor operable to lift grease from the water surface and transport the grease upwardly and outwardly away from the grease channel while causing water removed along with the grease to flow back down the conveyor into the grease channel.

2. The system of claim 1, further comprising aeration devices disposed in the grit channel so as to be submerged in waste water contained therein, the aeration devices being adapted to receive air from an air supply and to release air into the waste water.

3. The system of claim 2, wherein the fluid discharged by the grease skimmers comprises air and the aeration devices and the grease skimmers are connected so as to be supplied with air from a single common air supply.

4. The system of claim 2, wherein the aeration devices include air-jet devices disposed adjacent an in-flow end of the grit channel where water to be treated flows into the grit channel, the air-jet devices being operable to discharge air jets into the water to impart motion to the water so as to discourage grit from immediately settling to the bottom of the grit channel adjacent the in-flow end.

5. The system of claim 4, wherein the air-jet devices include a first air-jet device positioned proximate the bottom of the grit channel and a second air-jet device spaced above the first air-jet device.

6. The system of claim 1, wherein the grit and grease channels extend parallel to one another and are separated by a common wall that is operable to pass degritted water from the grit channel into the grease channel.

7. The system of claim 6, wherein the grit channel includes an additional wall extending parallel to and spaced from the common wall, upper portions of the walls of the grit channel defining a track along which the traveling grit removal device travels.

8. The system of claim 1, wherein the grease skimmers comprise pipes extending transversely across the grease channel and having orifices formed through a side wall of each pipe for discharging fluid therefrom.

9. The system of claim 8, wherein each grease skimmer pipe includes a plurality of orifices spaced lengthwise along the pipe.

10. The system of claim 1, further comprising a grit discharge trough, the grit removal device being arranged to discharge grit into the grit discharge trough.

11. The system of claim 10, further comprising a grit classifier arranged to receive a mixture of grit and water from the grit discharge trough and operable to separate the grit from the water.

* * * * *